United States Patent
Bates et al.

(10) Patent No.: US 8,516,380 B2
(45) Date of Patent: Aug. 20, 2013

(54) CONVERSATION ABSTRACTIONS BASED ON TRUST LEVELS IN A VIRTUAL WORLD

(75) Inventors: Cary Lee Bates, Rochester, MN (US); Jim Chun-Ta Chen, Rochester, MN (US); Zachary Adam Garbow, Rochester, MN (US); Gregory Edward Young, South St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 11/965,858

(22) Filed: Dec. 28, 2007

(65) Prior Publication Data
US 2009/0172539 A1    Jul. 2, 2009

(51) Int. Cl.
*G06F 3/00* (2006.01)
*G06F 9/00* (2006.01)
*G06F 17/00* (2006.01)

(52) U.S. Cl.
USPC ............ 715/757; 715/706; 715/758; 715/759

(58) Field of Classification Search
USPC .................................. 715/757, 706, 758, 759
See application file for complete search history.

(56) References Cited

U.S. PATENT DOCUMENTS

| | | | | |
|---|---|---|---|---|
| 5,880,731 A | * | 3/1999 | Liles et al. | 715/758 |
| 7,159,039 B1 | * | 1/2007 | Hahn et al. | 709/246 |
| 2001/0048449 A1 | * | 12/2001 | Baker | 345/758 |
| 2009/0002178 A1 | * | 1/2009 | Guday et al. | 340/573.1 |
| 2009/0193344 A1 | * | 7/2009 | Smyers | 715/753 |

* cited by examiner

*Primary Examiner* — Namitha Pillai
*Assistant Examiner* — Sabrina Greene
(74) *Attorney, Agent, or Firm* — Patterson & Sheridan LLP (57) ABSTRACT

Embodiments of the invention provide techniques for abstracting conversations between avatars within a virtual world. In one embodiment, the user of an avatar observing a conversation between other avatars may be presented with an abstracted version of the conversation. The abstraction may be performed so as to enable the user to determine the general topic or nature of the conversation, without receiving sensitive or detailed information included in the conversation. In one embodiment, the abstraction is performed by substituting words of the conversation with fewer words, or words having a more general meaning. The degree of abstraction performed may be based on a level of trust between the observer and the users engaged in conversation.

25 Claims, 5 Drawing Sheets

CONVERSATION ABSTRACTIONS BASED ON TRUST LEVELS IN A VIRTUAL WORLD

BACKGROUND OF THE INVENTION

1. Field of the Invention

Embodiments of the invention relate to the use of immersive virtual environments. More specifically, embodiments of the invention relate to abstracting communications taking place in an immersive virtual environment.

2. Description of the Related Art

A virtual world is a simulated environment which users may inhabit and in which the users may interact with virtual objects and locations of the virtual world. Users may also interact with one another via avatars. An avatar generally provides a graphical representation of an individual within the virtual world environment. Avatars are usually presented to other users as two or three-dimensional graphical representations of humanoids. Frequently, virtual worlds allow for multiple users to enter and interact with one another. Virtual worlds provide an immersive environment as they typically appear similar to the real world, with real world rules such as gravity, topography, locomotion, real-time actions, and communication.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

SUMMARY OF THE INVENTION

One embodiment of the invention includes a computer-implemented method. The method generally includes: receiving a communication from a first user to a second user of a virtual world, wherein the first user and the second user are participating in a conversation via avatars present in a location of the virtual world; identifying a third user having an avatar present in the same location, wherein the third user is not participating in the conversation; determining a level of trust for the third user relative to the first user and the second user; determining a level of abstraction corresponding to the determined level of trust; abstracting the communication to the determined level of abstraction; and presenting the abstracted communication to the third user.

Another embodiment of the invention includes a computer-readable storage medium including a program, which when executed on a processor performs an operation. The operation may generally include: receiving a communication from a first user to a second user of a virtual world, wherein the first user and the second user are participating in a conversation via avatars present in a location of the virtual world; identifying a third user having an avatar present in the same location, wherein the third user is not participating in the conversation; determining a level of trust for the third user relative to the first user and the second user; determining a level of abstraction corresponding to the determined level of trust; abstracting the communication to the determined level of abstraction; and presenting the abstracted communication to the third user.

Still another embodiment of the invention includes a system having a processor and a memory. The memory may store a program, which when executed by the processor, is configured to perform an operation. The operation may generally include: receiving a communication from a first user to a second user of a virtual world, wherein the first user and the second user are participating in a conversation via avatars present in a location of the virtual world; identifying a third user having an avatar present in the same location, wherein the third user is not participating in the conversation; determining a level of trust for the third user relative to the first user and the second user; determining a level of abstraction corresponding to the determined level of trust; abstracting the communication to the determined level of abstraction; and presenting the abstracted communication to the third user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A virtual world is a simulated environment in which users may be represented by avatars. An avatar may be used to "travel" through locations of the virtual world, such as virtual streets, buildings, rooms, etc. While in a given location, an avatar may also be used to interact with other avatars present therein. For example, a first avatar may be able to approach a second avatar, and may communicate with the second avatar by engaging in a conversation. One technique used to enable a conversation in the virtual world is to display text entered by the users in speech bubbles above the avatars (i.e., similar to speech bubbles shown in comic books). Another technique is to display text entered by the users in a chat window.

Conventionally, if a third avatar is present in the same location as the two avatars engaged in conversation, the user of the third avatar may also be able to view the text of the conversation. That is, the third user may be able to view speech bubbles above the heads of the avatars of the users engaged in conversation, or may be able to read text displayed in a chat window. Alternatively, if the first two users wish to keep their conversation private, the text of the conversation may be hidden from the third user. Thus, such conventional approaches are limited to providing an observer with complete access to a conversation, or with no access at all.

Embodiments of the invention provide techniques for abstracting conversations between avatars within a virtual world. In one embodiment, the user of an avatar observing a conversation between other avatars may be presented with an abstracted version of the conversation. The abstraction may be performed so as to enable the user to determine the general topic or nature of the conversation, without receiving sensitive or detailed information included in the conversation. In one embodiment, the abstraction is performed by substituting words of the conversation with fewer words, or words having a more general meaning. The degree of abstraction performed may be based on a level of trust between the observer and the users engaged in conversation.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
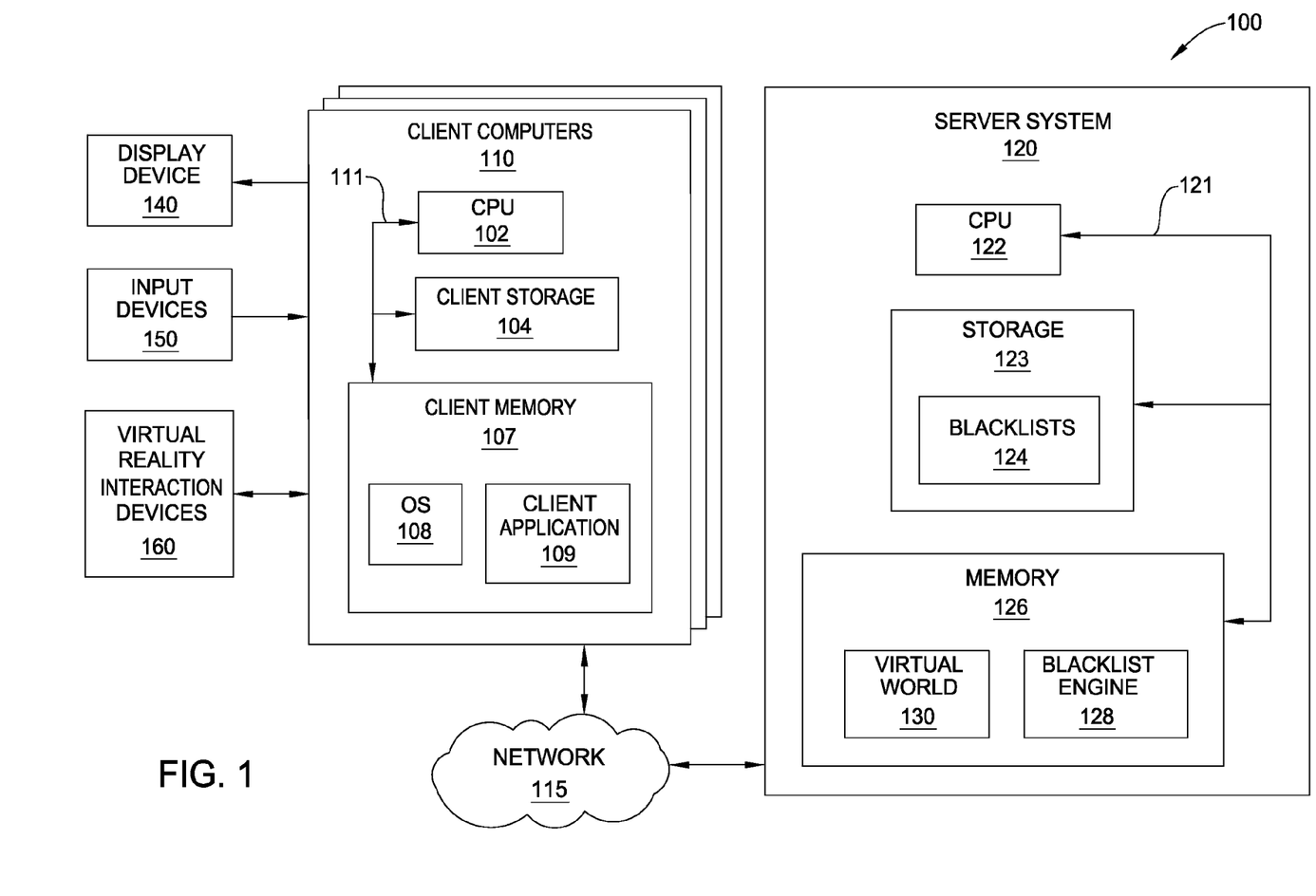
FIG. 1 is a block diagram that illustrates a client server view of computing environment, according to one embodiment of the invention.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, the server system 120 includes a CPU 122, which obtains instructions and data via a bus 121 from memory 126 and storage 123. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. The server system 120 may be operably connected to the network 115, which generally represents any kind of data communications network. Accordingly, the network 115 may represent both local and wide area networks, including the Internet. As shown, memory 126 may include a virtual world 130 and a conversation engine 128. In one embodiment, the virtual world 130 may be a software application that allows a user to explore and interact with an immersive environment.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115 (e.g., the Internet). Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.) As shown, client storage 104 may include user trust records 105.

In one embodiment, the client application 109 provides a software program that allows a user to connect to a virtual world 130 included on server 120, and once connected, to perform various user actions. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130. Such a display may include content from the virtual world determined from the user's line of sight at any given time. For the user, the display may include the avatar of that user or may be a camera eye where the user sees the virtual world through the eyes of the avatar representing this user.

The user may view the virtual world using a display device 140, such as an LCD or CRT monitor display, and interact with the client application 109 using input devices 150. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

Figure 2A:
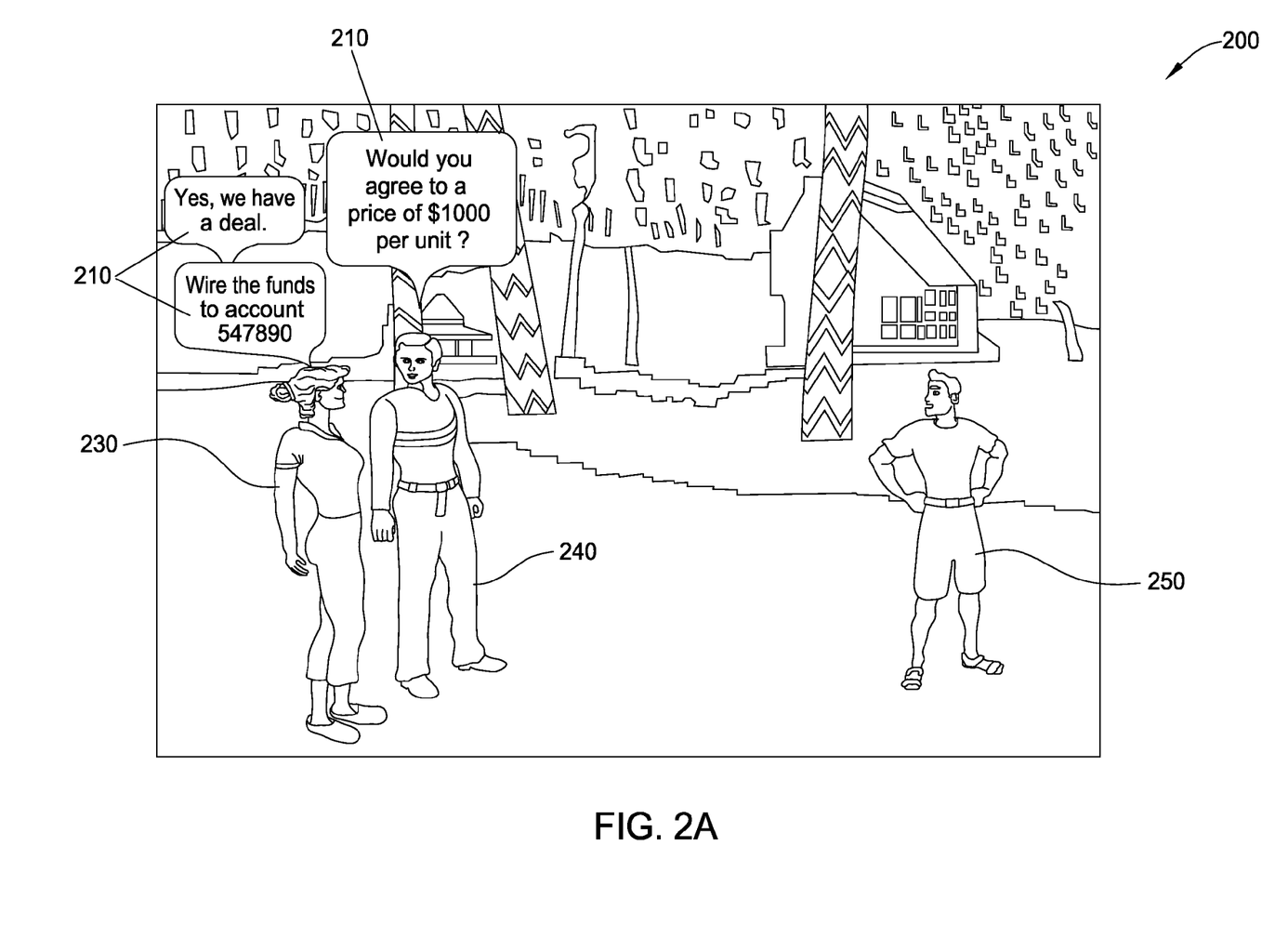
FIGS. 2A-2C illustrate a user display for a user participating in a virtual world, according to one embodiment of the invention.
Figure 2B:
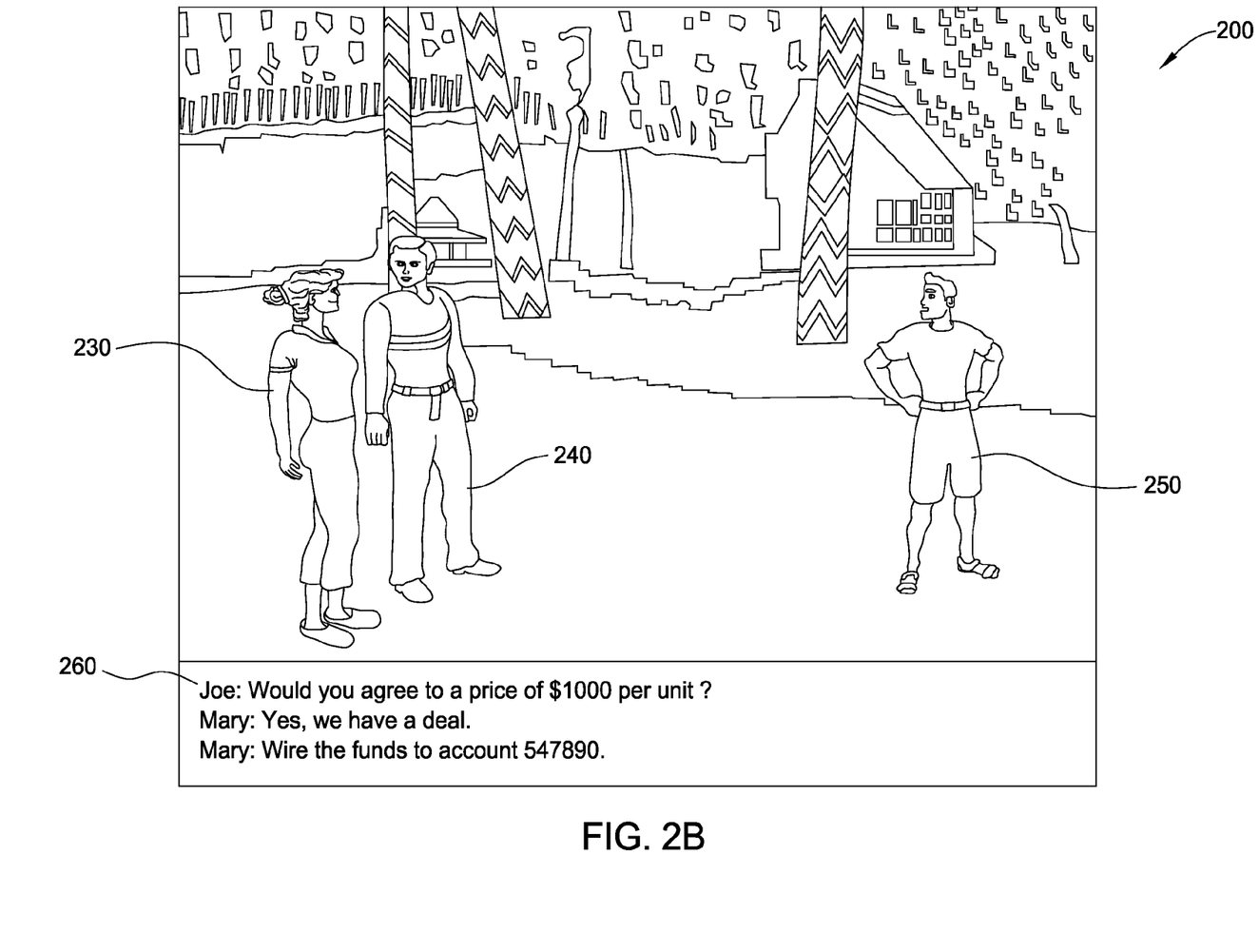

By way of example, FIGS. 2A-2B illustrate a user display 200 for a user participating in a virtual world, according to one embodiment of the invention. The user display 200 may be provided by the client application 109, according to one embodiment. FIGS. 2A-2B illustrate a situation in which a first avatar 230 is in conversation with a second avatar 240. In FIG. 2A, the text of the conversation is presented in speech bubbles 210 that appear above the heads of the avatars. Assume that user display 200 is displayed to the user of a third avatar 250. As shown, the third avatar 250 is present in the same location as the first avatar 230 and the second avatar 240, and may thus be able to view the speech bubbles 210 representing their conversation. In FIG. 2B, the text of the conversation appears in a chat window 260. More specifically, the text entered by the users participating in the conversation is displayed to the user of the third avatar 250 in the chat window 260, accompanied by the user's name.

Figure 2C:
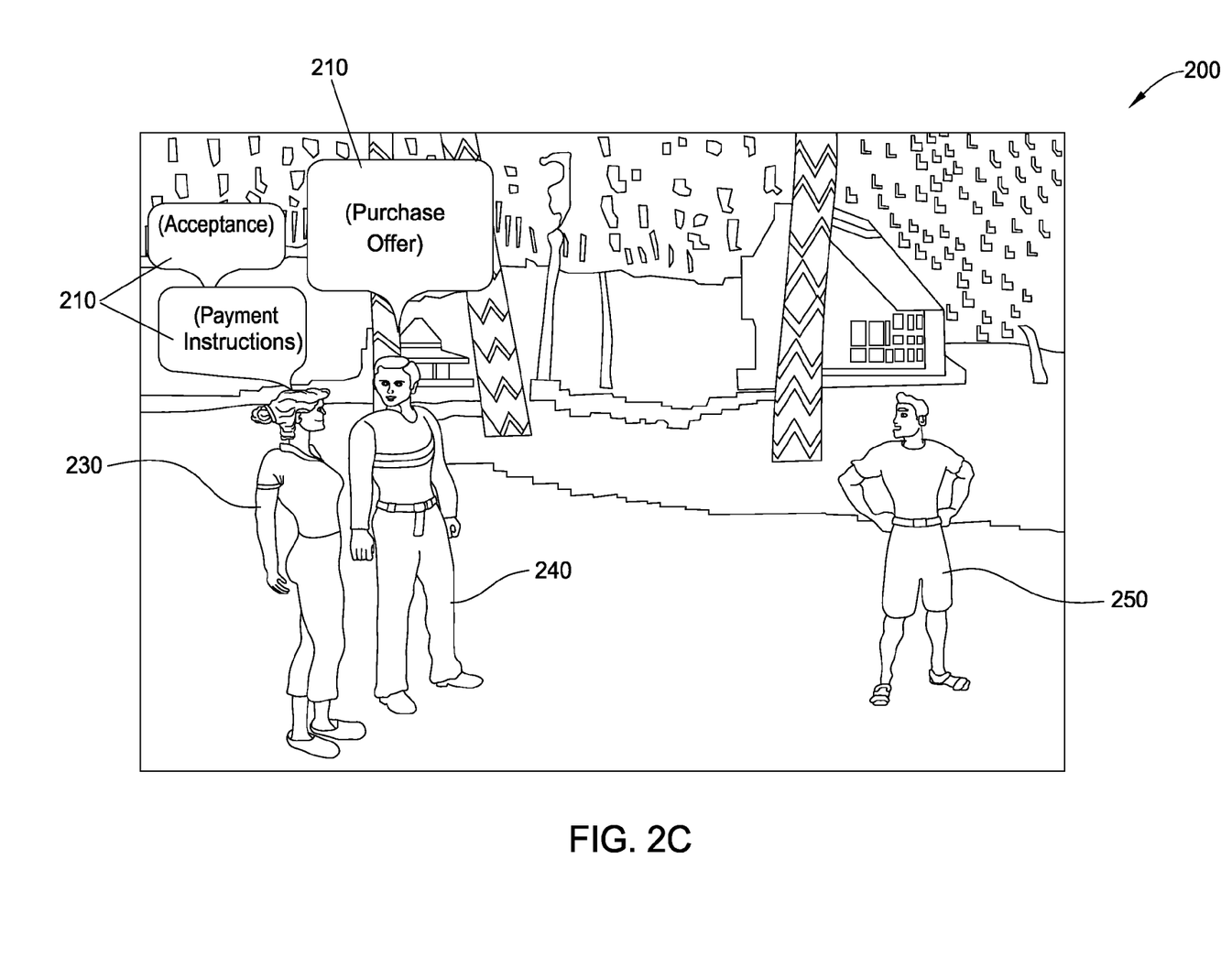

Referring again to FIG. 1, the conversation engine 128 may be a software program configured to abstract conversations taking place in a virtual world, according to one embodiment. More specifically, the conversation engine 128 may translate conversations into an abstracted form that may be presented to an observer of the conversation. The abstracted form may provide the observer with a general idea of the conversation, without revealing sensitive or detailed information included in the conversation. For example, FIG. 2C illustrates the user display 200 of the user of the third avatar 250 in the event that the conversation engine 128 has translated the conversation between the first avatar 230 and the second avatar 240 into an abstracted form. In contrast to the speech bubbles 210 shown in FIG. 2A, the speech bubbles 210 now contain descriptions of the text "spoken" by each avatar, instead of the actual text itself. In this example, the abstracted text is indicated by parentheses.

In one embodiment, the conversation engine 128 may be configured to perform an abstraction of a conversation by replacing specific words or phrases included in a statement with other words. For example, a proper noun included in a statement (e.g., a person's name, a place name, etc.) may be substituted with common noun (e.g., "man," "woman," "city," etc.). In another embodiment, multiple words may be replaced with a single word describing a class or category that includes the replaced words. Optionally, the replacement word(s) may be shown with a visual indicator, for instance brackets, parentheses, etc. For example, the conversation phrase "I wish to buy bread, fruit, and milk" may be translated to the phrase "I wish to buy [groceries]." In yet another embodiment, a phrase may be replaced with a description of the phrase. For example, the conversation phrase "I wish to buy bread, fruit, and milk" may be replaced with the description "[Purchase Request]."

In one embodiment, the conversation engine 128 may be configured to perform an abstraction of a conversation by using a set of language abstractions 124 included in storage 123. The language abstractions 124 may store related words or phrases at varying degrees of abstraction. For example, the language abstractions 124 may include groupings of words which may be replaced with a single word or a description. In another example, the language abstractions 124 may include proper nouns which may be replaced with common nouns. Of course, one of skill in the art will recognize that the abstraction of a conversation may be performed by other suitable techniques.

In one embodiment, the conversation engine 128 may be configured to perform varying degrees of abstraction based on a level of trust assigned to an observer to a conversation (e.g., the user of avatar 250 illustrated in FIG. 2A). In particular, in the situation of an observer having a low level of trust, the conversation engine 128 may perform a high level of abstraction, thus preventing the observer from receiving any personal or detailed information included in the conversation. Further, in the situation of an observer having a high level of trust, the conversation engine 128 may be configured to not perform any abstraction, thus allowing the observer to receive the original conversation without alteration. For example, referring to the example illustrated in FIG. 2A, the conversation between the first avatar 230 and the second avatar 240 relates to a business negotiation for purchase of a product. In the case that the observer (i.e., the user of the third avatar 250) has a low level of trust, instead of seeing the actual text of a statement made in the conversation, the observer may be presented with a general description of the statement (e.g., a speech bubble stating "Business discussion"). Assuming a higher level of trust, the observer may be presented with a more detailed description of the statement (e.g., a speech bubble stating "Purchase negotiation for product X"). Assuming a highest level of trust, the observer may be presented with the full text of the statement.

In one embodiment, the level of trust assigned to an observer may be determined based on the user trust data 105 belonging to a user engaged in the conversation. The user trust data 105 may be stored in client storage 104, and may be a data structure configured for specifying trust levels for particular users. For example, in the user trust data 105 belonging to the user of avatar 230, a given observer (e.g., the user of avatar 250) may be specified as having a low level of trust. Optionally, users may be specified as being excluded, meaning they are completely blocked from viewing conversations of the owner of the user trust data 105. In another embodiment, user trust data 105 may include predefined criteria to assign levels of trust according to characteristics of the observer. For example, the user trust data 105 may specify that users belonging to the groups "Friends" and "Associates" are assigned a high level of trust.

In one embodiment, the user trust data 105 may specify a level of trust for a user based on situational characteristics of a conversation, such as a location (e.g., at the office, at home, etc.), companions (e.g., conversations with the boss, conversations with clients, etc.), or time frame (e.g., conversations occurring between 1 PM and 4 PM each weekday). Further, the user trust data 105 may specify a level of trust based on a current profile of the owner, meaning a general description of the owner's intended activity or mode of interacting while in the virtual world. For example, an observer may be assigned a low level of trust while the owner is engaged in a conversation while in a "Work" profile (i.e., the owner of the user trust data 105 is conducting business affairs). Furthermore, the user trust data 105 may specify a level of trust based on the owner's current activity (e.g., working, talking, etc.). Furthermore, the user trust data 105 may specify a level of trust in terms of membership in a defined group of users of the virtual world. For example, the user trust data 105 may specify that members of the group "Competitors" should always be assigned a low level of trust. In another example, the user trust data 105 may specify that a given observer should be assigned a low level of trust when the owner is in the company of a particular user, or is in the company the group "Business Clients."

In one embodiment, an observer may be allowed to interact with the users engaged in the conversation. In particular, the observer may be allowed to communicate with the users engaged in conversation, but may only be presented with an abstracted version of statements made within the conversation. In one embodiment, the level of trust assigned to the observer may vary with the amount and/or nature of interactions with the users engaged in the conversation. For example, referring to the example illustrated in FIG. 2A, assume the third avatar 250 interacts with the first avatar 230 and the second avatar 240. In this situation, the level of trust assigned to the user of the third avatar 250 may be increased in proportion to the amount of interaction with the other two avatars. Accordingly, assuming the observer interacts with the users engaged in conversation over a period of time, the observer may be allowed to view an increasingly accurate (i.e., less abstract) form of the conversation over that period.

In one embodiment, the conversation engine 128 may be configured to allow a user to observe a conversation only when the user's avatar is located within a virtual hearing range of the avatars of the users engaged in conversation. The hearing range may be limited to a predefined distance for "hearing" other avatars within the virtual world. Further, the hearing range may take into account any intervening objects included in the virtual world, which may be defined as obstructing sight and/or sounds between the avatars. Furthermore, the hearing range may be limited by other factors, for example any background noise existing in the same location as the avatars. In another embodiment, a user may be limited to observe a conversation based on a visual range, meaning a line of sight within a predefined distance for one avatar to view another avatar.

Of course, the embodiments described above are intended to be illustrative, and are not limiting of the invention. Other embodiments are broadly contemplated. For example, while the above examples are described with reference to text-based conversations, other embodiments may be directed to voice-based conversations, or to conversations using other forms of communication.

Figure 3:
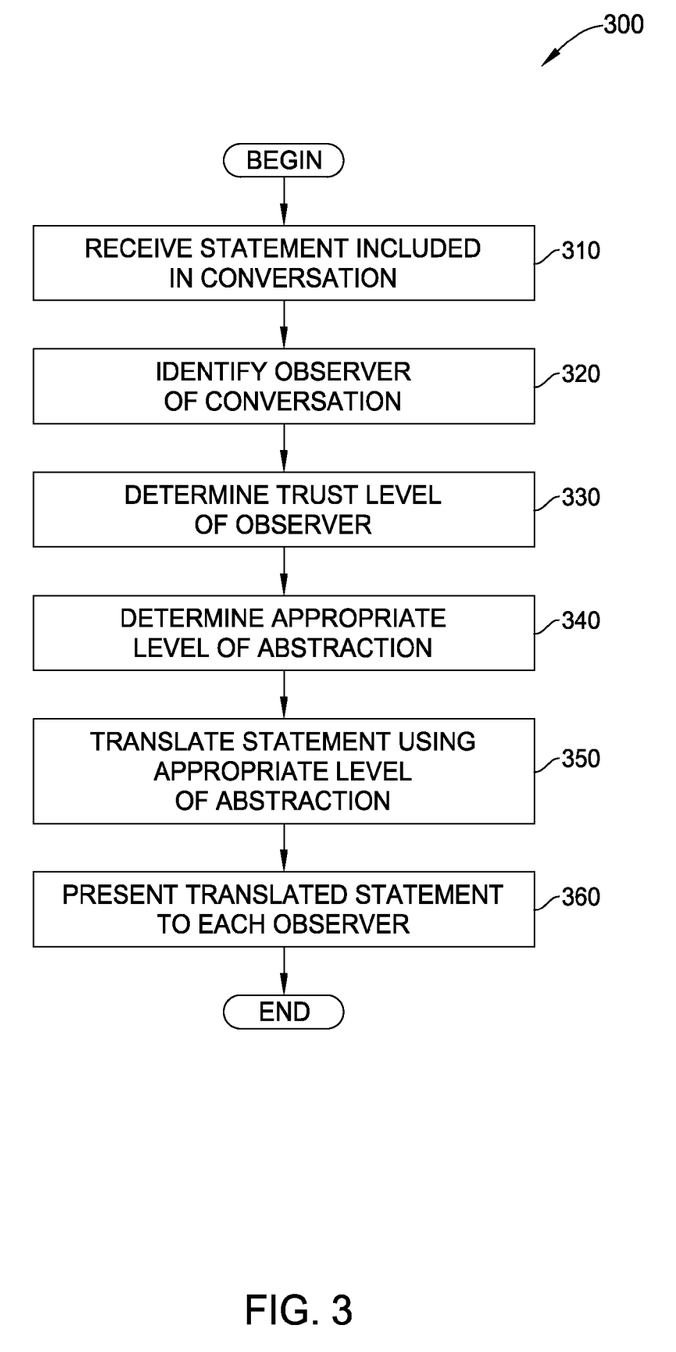
FIG. 3 is a flow diagram illustrating a method for abstracting a conversation between avatars in a virtual world, according to one embodiment of the invention.

FIG. 3 is a flow diagram illustrating a method 300 for abstracting a conversation between avatars in a virtual world, according to one embodiment of the invention. Persons skilled in the art will understand that, even though the method is described in conjunction with the system of FIG. 1, any system configured to perform the steps of the method 300, in any order, is within the scope of the present invention.

The method 300 begins at step 310, by receiving a statement included in a conversation. For example, the conversation engine 128 may be configured to receive text entered in a client application 109 by a user of a first avatar 230 in order to communicate to a user of a second avatar 240. At step 320, an observer to the conversation may be identified. That is, a user having an avatar located within a predefined hearing range of the conversation may be identified. For example, the conversation engine 128 may be configured to identify the third avatar 250 as being within a hearing range of the conversation between the first avatar 230 and the second avatar 240. Optionally, a user having an avatar within a visual range of the avatars engaged in conversation may be identified.

At step 330, a trust level may be determined for the observer. In one embodiment, the trust level for the observer may be specified by a user engaged in the conversation (e.g., in user trust data 105). In another embodiment, the trust level may be based on past interactions with the observer. In yet another embodiment, the trust level may be based on the situational characteristics of the users engaged in the conversation.

At step 340, an appropriate level of abstraction may be determined for each observer. In one embodiment, the appropriate level of abstraction may be based on the level of trust determined at step 330. Step 340 may be performed, for example, by the conversation engine 128. At step 350, the statement received at step 310 may be translated to the appropriate level of abstraction determined at step 340. That is, words included in the statement may be replaced with substitute words, such that the specific meaning of the replaced words is obscured. For example, the conversation engine 128 may be configured to translate a statement by using the language abstractions 124 included in storage 123 (shown in FIG. 1).

At step 360, the translated statement may be presented to the observer. The observer may thus be able to determine a general sense of the conversation, but may not receive detailed or sensitive information that the users engaged in the conversation may wish to keep private. For example, conversation engine 128 may be configured to present the observer with a translated form of the statement. The presentation may be performed, e.g., in speech bubbles 210 or in chat window 260, as shown in FIGS. 2A-2B.

Of course, the method 300 is provided for illustrative purposes only, and is not limiting of the invention. It is contemplated that the method 300 may be modified to include additional steps. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer implemented method to maintain user privacy by abstracting communications in a virtual world, comprising:
   receiving a communication sent from a first user conversing with a second user represented by respective avatars at a location in a virtual world, wherein the communication includes sensitive information;
   identifying a third user having an avatar present in the same location, wherein the third user is not an intended recipient of the communication;
   determining that the third user's avatar is within a virtual hearing range for observing the communication between the first user and the second user, wherein the third user's avatar observes the communication between the first user and the second user when the third user's avatar is within the virtual hearing range, wherein the virtual hearing range is determined based on a maximum predefined distance in the virtual world;
   determining, based on predetermined trust criteria, a level of trust for the third user relative to the first user and the second user;
   preventing the sensitive information from being disclosed to the third user, by abstracting the communication based on the determined level of trust; and
   presenting the abstracted communication to the third user.

2. The computer-implemented method of claim 1, wherein the predetermined trust criteria include one or more predefined lists of contacts for the first user or the second user.

3. The computer-implemented method of claim 2, wherein the predetermined trust criteria further include: (i) one or more past interactions between the third user and at least one of the first user and the second user, and (ii) a time of day when the communication is sent from the first avatar to the second avatar.

4. The computer-implemented method of claim 3, wherein the predetermined trust criteria further include at least one of: (i) a situation context of the first user within the virtual world, and (ii) a situation context of the second user within the virtual world.

5. The computer-implemented method of claim 4, wherein the abstracted communication is presented to the third user in at least one of (i) one or more dialog balloons visible in the virtual world, and (ii) one or more chat windows.

6. The computer-implemented method of claim 5, wherein abstracting the communication comprises substituting one or more words of the communication with one or more substitute words, wherein the substitute words are classified according to one or more levels of abstraction.

7. The computer-implemented method of claim 6, wherein the level of trust may be modified during a communication based on the third user's interactions with the first user and the second user.

8. The computer-implemented method of claim 7, wherein the predetermined trust criteria include one or more permissions of the user of third avatar with regard to communications between the the first user and the second user.

9. The computer-implemented method of claim 8, wherein abstracting the communication comprises generating a translated communication, wherein the translated communication does not include any confidential content of the communication.

10. The computer-implemented method of claim 1, wherein the virtual hearing range is further based on the presence of at least one of an intervening object and an intervening sound.

11. A computer-readable storage medium including a program, which when executed on a processor performs an operation to maintain user privacy by abstracting communications in a virtual world, comprising:
   receiving a communication sent from a first user conversing with a second user represented by respective avatars at a location in a virtual world, wherein the communication includes sensitive information;
   identifying a third user having an avatar present in the same location, wherein the third user is not an intended recipient of the communication;
   determining that the third user's avatar is within a virtual hearing range for observing the communication between the first user and the second user, wherein the third user's avatar observes the communication between the first user and the second user when the third user's avatar is within the virtual hearing range, wherein the virtual hearing range is determined based on a maximum predefined distance in the virtual world;
   determining, based on predetermined trust criteria, a level of trust for the third user relative to the first user and the second user;
   preventing the sensitive information from being disclosed to the third user, by abstracting the communication based on the determined level of trust; and
   presenting the abstracted communication to the third user.

12. The computer-readable storage medium of claim 11, wherein the predetermined trust criteria include one or more predefined lists of contacts for the first user or the second user.

13. The computer-readable storage medium of claim 12, wherein the predetermined trust criteria further include: (i) one or more past interactions between the third user and at least one of the first user and the second user, and (ii) a time of day when the communication is sent from the first avatar to the second avatar.

14. The computer-readable storage medium of claim 13, wherein the predetermined trust criteria include at least one of: (i) a situation context of the first user within the virtual world, and (ii) a situation context of the second user within the virtual world.

15. The computer-readable storage medium of claim 14, wherein the abstracted communication is presented to the third user in at least one of (i) one or more dialog balloons visible in the virtual world, and (ii) one or more chat windows.

16. The computer-readable storage medium of claim 15, wherein abstracting the communication comprises substituting one or more words of the communication with one or more substitute words, wherein the substitute words are classified according to one or more levels of abstraction.

17. The computer-readable storage medium of claim 16, wherein the level of trust may be modified during a communication based on the third user's interactions with the first user and the second user.

18. The computer-readable storage medium of claim 17, wherein the predetermined trust criteria include one or more permissions of the user of third avatar with regard to communications between the the first user and the second user.

19. The computer-readable storage medium of claim 18, wherein abstracting the communication comprises generating a translated communication, wherein the translated communication does not include any confidential content of the communication.

20. The computer-program product of claim 11, wherein the virtual hearing range is further based on the presence of at least one of an intervening object and an intervening sound.

21. A system, comprising:
a processor; and
a memory containing a program, which when executed by the processor is configured to perform an operation to maintain user privacy by abstracting communications in a virtual world, comprising:
- receiving a communication sent from a first user conversing with a second user represented by respective avatars at a location in a virtual world, wherein the communication includes sensitive information;
- identifying a third user having an avatar present in the same location, wherein the third user is not an intended recipient of the communication;
- determining that the third user's avatar is within a virtual hearing range for observing the communication between the first user and the second user, wherein the third user's avatar observes the communication between the first user and the second user when the third user's avatar is within the virtual hearing range, wherein the virtual hearing range is determined based on a maximum predefined distance in the virtual world;
- determining, based on predetermined trust criteria, a level of trust for the third user relative to the first user and the second user;
- preventing the sensitive information from being disclosed to the third user, by abstracting the communication based on the determined level of trust; and
- presenting the abstracted communication to the third user.

22. The system of claim 21, wherein the predetermined trust criteria include one or more predefined lists of contacts for the first user or the second user.

23. The system of claim 22, wherein the predetermined trust criteria further include: (i) one or more past interactions between the third user and at least one of the first user and the second user, and (ii) a time of day when the communication is sent from the first avatar to the second avatar.

24. The system of claim 23, wherein the predetermined trust criteria include at least one of: (i) a situation context of the first user within the virtual world, and (ii) a situation context of the second user within the virtual world.

25. The system of claim 24, wherein abstracting the communication comprises generating a translated communication, wherein the translated communication does not include any confidential content of the communication.

* * * * *